United States Patent
Jeffery, III

(10) Patent No.: US 12,219,425 B2
(45) Date of Patent: Feb. 4, 2025

(54) TRIGGERING LOCATION-BASED FUNCTIONALITY BASED ON USER PROXIMITY

(71) Applicant: Niantic, Inc., San Francisco, CA (US)

(72) Inventor: Gordon Paul Jeffery, III, Kirkland, WA (US)

(73) Assignee: NIANTIC, INC., San Francisco, CA (US)

( * ) Notice: Subject to any disclaimer, the term of this patent is extended or adjusted under 35 U.S.C. 154(b) by 370 days.

(21) Appl. No.: 17/727,550

(22) Filed: Apr. 22, 2022

(65) Prior Publication Data

US 2023/0345200 A1  Oct. 26, 2023

(51) Int. Cl.
| | |
|---|---|
| H04W 4/02 | (2018.01) |
| A63F 13/31 | (2014.01) |
| A63F 13/327 | (2014.01) |
| A63F 13/34 | (2014.01) |
| A63F 13/795 | (2014.01) |

(52) U.S. Cl.
CPC ............ *H04W 4/023* (2013.01); *A63F 13/31* (2014.09); *A63F 13/327* (2014.09); *A63F 13/34* (2014.09); *A63F 13/795* (2014.09)

(58) Field of Classification Search
None
See application file for complete search history.

(56) References Cited

U.S. PATENT DOCUMENTS

| | | | |
|---|---|---|---|
| 8,116,323 B1 * | 2/2012 | Evans | A63F 13/79 370/400 |
| 2008/0056215 A1 | 3/2008 | Kopikare et al. | |
| 2015/0273321 A1 * | 10/2015 | Schwartz | A63F 13/428 463/36 |
| 2015/0373509 A1 | 12/2015 | Wang et al. | |
| 2021/0387098 A1 | 12/2021 | Jeffery | |

FOREIGN PATENT DOCUMENTS

KR  10-2020-0070443 A  6/2020

OTHER PUBLICATIONS

PCT International Search Report and Written Opinion, PCT Application No. PCT/IB2023/053746, Jul. 18, 2023, 12 pages.

* cited by examiner

*Primary Examiner* — Kenneth B Wells
(74) *Attorney, Agent, or Firm* — FENWICK & WEST LLP

(57) ABSTRACT

A client device associated with a user of a location-based application detects client devices associated with other users which are within proximity of the client device. This detection of other client devices may result in various application actions occurring, such as triggering a multi-user activity between users. Detection of client devices may be performed using personal area network devices of the client devices, such as Bluetooth. Proximity detection can occur when client devices are disconnected from an online system hosting the location-based application with the detection later being reported to the online system by one or both devices.

20 Claims, 8 Drawing Sheets

TRIGGERING LOCATION-BASED FUNCTIONALITY BASED ON USER PROXIMITY

TECHNICAL FIELD

The present disclosure relates generally to device proximity detection and, in particular, to detecting player devices over a local area network for use in location-based applications.

BACKGROUND

Location-based applications use the real world as their geography. Parallel reality games are a type of location-based application that use a virtual world that parallels the real-world geography. The parallel virtual world may span the entire real world, and players from all over the world may interact and perform various game objectives in the parallel virtual world by navigating and performing actions in the real world. Certain location-based applications may also offer multi-user activities. In the example of a parallel reality game, similarly-located players may play together in the same physical locations in the real world, such as by engaging in organized community game actions (e.g., live game actions associated with a particular geographic location). However, outside of planned application functionality (e.g., game actions), similarly-located application users may cross paths in the physical world during their daily lives without being aware of each other. For example, two players of a parallel reality game may pass each other in public space while carrying their respective mobile devices used to play the parallel-reality game. As such, application users may be unaware of the user community and opportunities for dynamic interactions that they encounter.

SUMMARY

A method, system, and computer-readable storage medium are disclosed for proximity detection between client devices associated with users of a location-based application. A user's client device may detect client devices associated with other users within a proximity of the client device. A proximity detection of other client devices may result in application functionality (e.g., game actions in a location-based parallel reality game) corresponding to the detection, such as an exchange of application data (e.g., game data between players or their client devices, game progress for a player, access to a game feature, or establishing a connection between players). In embodiments, detection of client devices is performed using personal area network devices of the client devices, such as Bluetooth® devices or Wi-Fi Direct devices. In the same or different embodiments, proximity detection can occur when client devices are disconnected from an online system hosting the location-based application. In this case, the player devices can store proximity detections of other client devices and provide information describing the detections to the online system after connecting to the online system (e.g., via the internet). The online system then performs application functionality (e.g., game actions) based on received information describing proximity detections.

In some embodiments, a first client device detects a second client device within a proximity of the first client device. A first player of a location-based application is associated with the first client device and a second player is associated with the second client device. In response to detecting the second client device, the first client device provides a notification of availability of a multiplayer activity involving the first player and the second player. For example, the first client device displays on the screen of the first client device a prompt asking if the user wants to participate in a raid with a nearby player. The first client device receives user input indicating that the first player has selected the notification and in response, provides the multiplayer activity of the location-based application.

In some embodiments, the first client device detects the second client device via a third client device. The second client device is within a first proximity of the first client device. For example, the second client device and the first client device may be outside of broadcasting network range of one another but are within an enhanced range of one another. The first client device detects the third client device within a second proximity (e.g., within a Bluetooth® broadcasting range). The first client device receives data from the third client device indicating that the third client device has detected the second client device to be within a third proximity of the third client device. For example, the third client device may be located in the middle of the first and second client devices and within both of their broadcasting ranges. The first client device determines, using the data received from the third client device, a likelihood that the second client device is within the first proximity. For example, the first client device may use a player identifier of a player using the second client device and timestamp of a Bluetooth LE advertisement broadcasted by the second client device to determine a threshold-exceeding likelihood of the second client device being within the first proximity of the first client device at substantially the same time as identified in the timestamp (e.g., within five minutes before or after the time identified in the timestamp).

These and other features, aspects and advantages may be better understood with reference to the following description and appended claims. The accompanying drawings illustrate specific embodiments and, together with the description, serve to explain various principles. However, the drawings should not be considered limiting. Rather, the scope of protection should be determined from the claims.

DETAILED DESCRIPTION

Reference will now be made to several embodiments, examples of which are illustrated in the accompanying figures. It is noted that wherever practicable similar or like reference numbers are used in the figures to indicate similar or like functionality. Also, where similar elements are identified by a reference number followed by a letter, a reference to the number alone in the description that follows may refer to all such elements, any one such element, or any combination of such elements. One skilled in the art will readily recognize from the following description that alternative embodiments of the structures and methods may be employed without departing from the principles described.

Reference will also be made to a parallel reality gaming system to describe one context in which a proximity-based functionality (e.g., multiplayer augmented reality activity) can be triggered. However, the proximity detection and functionalities triggered by proximity detection described may extend to suitable multi-user online applications. Examples of multi-user online applications include, but are not limited to, social networking, educational programs, group health and fitness activities, multi-user gaming, or any suitable multi-user activity facilitated over a wireless network.

Exemplary Location-Based Parallel Reality Gaming System

Various embodiments are described in which player device proximity detection is performed in the context of a parallel reality game. A parallel reality game is a location-based game having a virtual world geography that parallels at least a portion of the real-world geography such that player movement and actions in the real-world affect actions in the virtual world. However, the subject matter of the present disclosure may be equally applicable to other location-based applications, such as other types of games or interactive applications.

Figure 1:
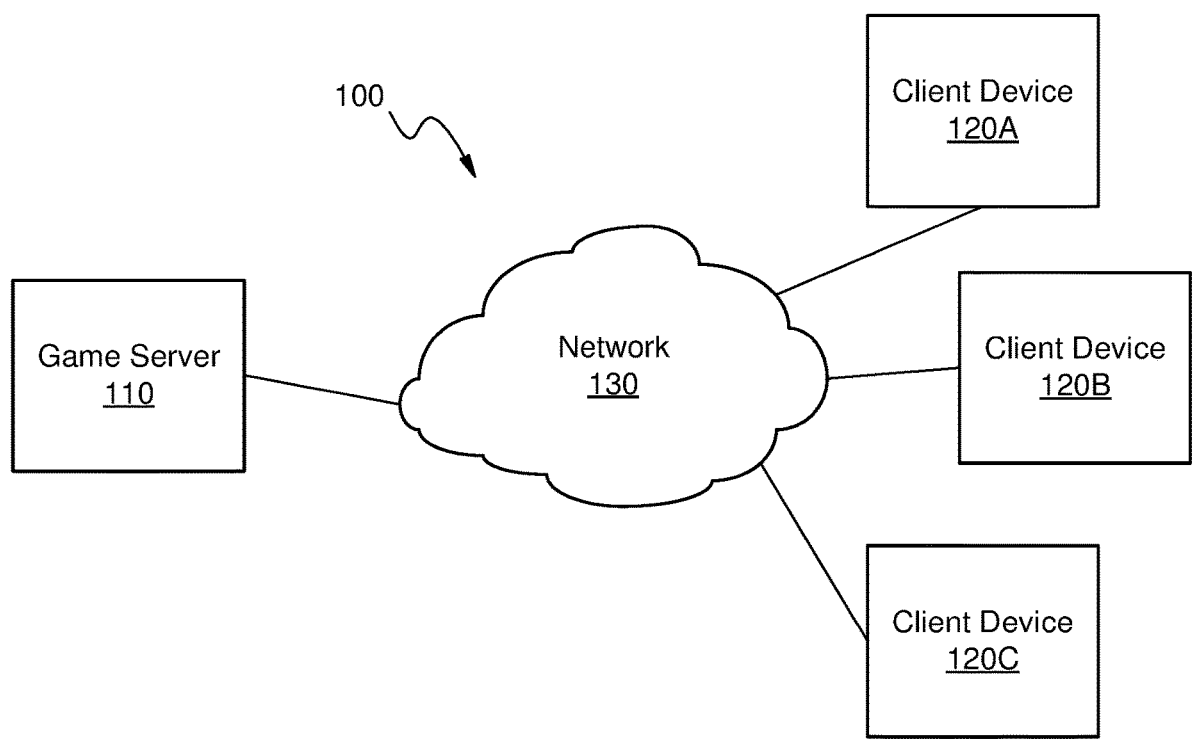
FIG. 1 is a block diagram illustrating a computing environment for a location-based gaming system, according to one embodiment.

FIG. 1 is a block diagram illustrating one embodiment of a computing environment for a location-based gaming system 100. In the embodiment shown, the location-based gaming system 100 provides for the interaction of a plurality of players in a virtual world having a geography that parallels the real world. In particular, a geographic area in the real world can be linked or mapped directly to a corresponding area in the virtual world. A player can move about in the virtual world by moving to various geographic locations in the real world. For instance, the system 100 can track a player's position in the real world and update the player's position in the virtual world based on the player's current position in the real world. For example, a coordinate system in the real world (e.g., longitude and latitude) may be mapped to a coordinate system in the virtual world (e.g., x/y coordinates, virtual longitude and latitude, etc.).

In the embodiment shown in FIG. 1, the system 100 has a client-server architecture, where a game server 110 communicates with one or more client devices 120 over a network 130. Although three client devices 120 are illustrated in FIG. 1, any number of client devices 120 can be connected to the game server 110 over the network 130. In other embodiments, the distributed location-based gaming system 100 includes different or additional elements. Furthermore, the functions may be distributed among the elements in a different manner than described.

The game server 110 hosts a universal state of the location-based game and provides game status updates to players' client devices 120 (e.g., based on actions taken by other players in the game, changes in real-world conditions, changes in game state or condition, etc.). The game server 110 receives and processes input from players in the location-based game. Players may be identified by a username or player ID (e.g., a unique number or alphanumeric string) that the players' client devices 120 send to the game server 110 in conjunction with the players' inputs. In some embodiments, the game server hosts several location-based games, other types of games, or other applications.

In various embodiments, the game server 110 processes game actions based on client devices 120 detecting each other in the real world. The game server 110 receives information from a client device 120 indicating that a client device 120 (e.g., client device 120A) was in proximity to another client device (e.g., client device 120B). In particular, the information identifies one or more players associated with the relevant client devices 120, such as a player username or ID or a device ID. Proximity detection is described in greater detail below with reference to the client devices 120 and FIG. 2. The game server 110 further performs various game actions based on the information received from client devices 120 describing detections of another client device 120. Game actions based on device proximity detection and various embodiments of the game server 110 are described in greater detail below with reference to FIG. 3.

The client devices 120 are computing devices with which players can interact with the game server 110. For instance, a client device 120 can be a smartphone, portable gaming device, tablet, personal digital assistant (PDA), cellular phone, navigation system, handheld GPS system, or other such device. Although only three client devices are depicted in FIG. 1 (i.e., client device 120A, 120B, and 120C), the location-based gaming system 100 may include any number of client devices 120. A client device 120 executes software associated with the location-based game hosted by the server 110, such as a client game application, to allow a player to interact with the virtual world. A client device 120 may also include hardware, software, or both for providing a user interface for chat rooms. The client devices 120 are configured to detect other client devices 120 when the devices are in proximity to each other in the physical world (i.e., device proximity detections). In embodiments, client devices 120 perform proximity detection using a personal area network (PAN) device and associated communication protocols (e.g., Bluetooth, ZigBee, infrared, ultra-wideband, near-field communication, Wi-Fi Direct, etc.). The client device 120 may store information describing the detections of other client device 120 in the physical world (e.g., player identifiers associated with a user of the detected client device or device identifiers associated with the detected client device). The client device 120 may provide the stored information corresponding to the detections to the game server 110. Various embodiments of client device 120 are described in greater detail below, with reference to FIG. 2.

The distance range at which client devices 120 can perform proximity detections of other client devices 120 may vary depending on the technique or devices used. If the client devices 120 use a PAN device for proximity detection, as described above, the distance range for proximity detection is a range at which the particular PAN device is able to detect another PAN device. For example, in the case of Bluetooth Low Energy (LE), a Bluetooth LE device can detect or connect to other Bluetooth LE devices at a range of approximately sixty meters. As another example, in the case of Wi-Fi direct, a Wi-Fi direct device can detect or connect to other Wi-Fi direct devices at a range of approximately one hundred meters. In the same or different embodiments, the client device 120 may use other devices or techniques to perform proximity detection of other client devices 120. As an example, the client devices 120 may use geographic coordinates of client devices 120 determined using GPS receivers on the client devices 120. In this case, the distance range for proximity detection may be an established threshold distance (e.g., twenty meters). As another example, the client device 120 may connect to local area networks (LANs), such as Wi-Fi networks, and identify other devices connected to the same LAN. In this case, the distance range for proximity detection may be the range at which client devices 120 can connect to a particular LAN, which may be influenced by relevant software and hardware providing the LAN (e.g., a type of wireless LAN router used).

The network 130 can be any type of communications network, such as a local area network (e.g., intranet), wide area network (e.g., internet), or some combination thereof. The network can also include a direct connection between a client 120 and the game server 110. In general, communication between the game server 110 and a client 120 can be carried via a network interface using any type of wired and/or wireless connection, using a variety of communication protocols (e.g., TCP/IP, HTTP, S1v1TP, FTP), encodings or formats (e.g., HTML, JSON, XML), and/or protection schemes (e.g., VPN, secure HTTP, SSL).

Figure 2:
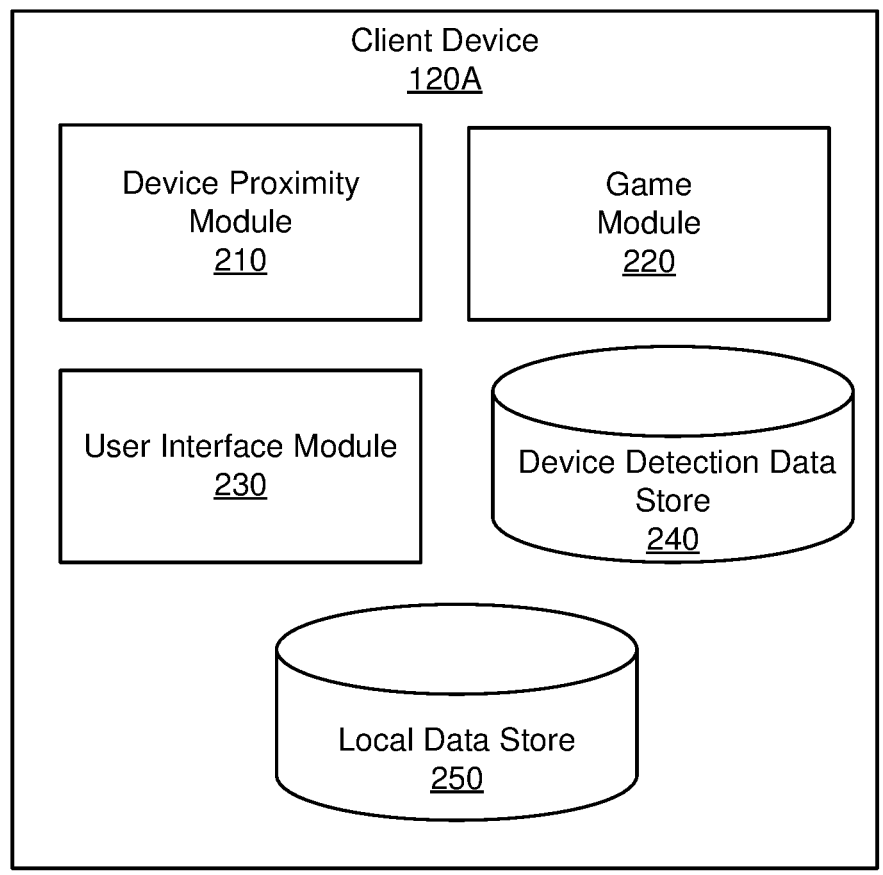
FIG. 2 is block diagram of a client device shown in FIG. 1, according to one embodiment.

FIG. 2 is block diagram of one embodiment of the client device 120A shown in FIG. 1. The client device 120A is associated with a player of the parallel-reality game. Other client devices (e.g., client devices 120B and 120C) have the same or similar architectures and are associated with other players of the parallel-reality game. Because the gaming system 100 is for a location-based game, the client devices 120 are preferably portable computing devices, such as smartphones or other portable devices, that can be easily carried or otherwise transported with a player. A player can interact with the virtual world simply by carrying or transporting their client device 120 in the actual world. In the embodiment shown, the client device 120A includes a device proximity module 210, a game module 220, a user interface module 230, a device detection data store 240, and a local data store 250. In other embodiments, the client device 120A includes additional or different components than those depicted in FIG. 2.

The device proximity module 210 detects other client devices 120 which come within proximity to the client device 120A associated with the player of the location-based game (i.e., a player device) as the player moves around with the client device 120A in the real world. In some embodiments, the device proximity module 210 includes a PAN device. In these embodiments, the PAN device broadcasts information describing the broadcasting client device 120 or a player associated with the broadcasting client device 120, such that another client device 120 within a proximity of the broadcasting client device 120 can receive the broadcast information. Furthermore, the PAN device includes a scanner which identifies information broadcast by PAN devices of other client devices 120. For example, if the PAN device is a Bluetooth LE device, the Bluetooth LE device may use one more channels to continuously broadcast an advertisement data packet including a Universally Unique Identifier (UUID) corresponding to the Bluetooth LE device and a message including an identifier of the player (e.g., a player ID or username). The Bluetooth LE device may periodically or continuously listen to the one or more channels used to broadcast the advertisement data packet, as described above.

In the same or different embodiments, after another client device 120 is detected, the device proximity module 210 stores information describing the detection in the device detection data store 240. In particular, the device proximity module 210 stores information identifying the player received by the PAN device or other contextual information, such as a timestamp indicating when the detection occurred. The device proximity module 210 provides information corresponding to device detections to the game module 220. In alternative embodiments, the device proximity module 210 provides information corresponding to device detection directly to the game server 110.

In some embodiments, the device proximity module 210 verifies that a particular device proximity detection satisfies one or more criteria before storing information describing the device proximity detection in the device detection data store 240 or providing the information to the game module 220. For example, the device proximity module 210 may verify device proximity detections based on criteria corresponding to a time of the device proximity detection, a geographic location of the device proximity detection, a player associated with the detected device, or other contextual information. In one embodiment, the device proximity module 210 verifies that a detected client device 120 or a player associated with a detected client device 120 has not been detected within a previous time interval (e.g., the previous hour, previous day, previous week, etc.). For instance, the location-based game may perform game actions based on proximity detections of the same client device 120 only once per time interval. In this way, the location-based game can prevent multiple or frequent game actions for two players whose client devices 120 are in the same physical location for a period of time or otherwise detect each other multiple times in some time interval. By verifying device proximity detections satisfy one or more criteria, the device proximity module 120 prevents duplicate storage of proximity detections which will not result in additional game actions after being provided to the game server 110. In alternative embodiments, the device proximity module 210 stores information describing all device proximity detections and the device proximity detections are instead verified based on one or more criteria as described above by the game module 220 or the game server 110.

The device proximity module 210 can enable a range enhancement for proximity detection. An enhanced range may be a distance between two devices that is greater than a local network or PAN broadcasting range. For example, a device's Bluetooth® LE network range is approximately a sixty meter radius, and another device that is one hundred and ten meters away may not be within detectability range of the device's Bluetooth® network range. The device proximity module 210 enables a range enhancement that enables the other device to be within proximity of the device. To enable range enhancement, the device proximity module 210 can detect another device (e.g., the device 120B) within its network broadcasting range (e.g., local network or PAN). Through data exchange with the client device 120B, the device proximity module 210 can determine the presence of yet another device (e.g., the device 120C) that is within the network broadcasting range of the client device 120B but is not within the network broadcasting range of the client device 120A. In this example, the client device 120C is in an enhanced range of the client device 120A. Furthermore, the device proximity module 210 determines that the client devices 120A, 120B, and 120C are proximal to one another.

Figure 4:
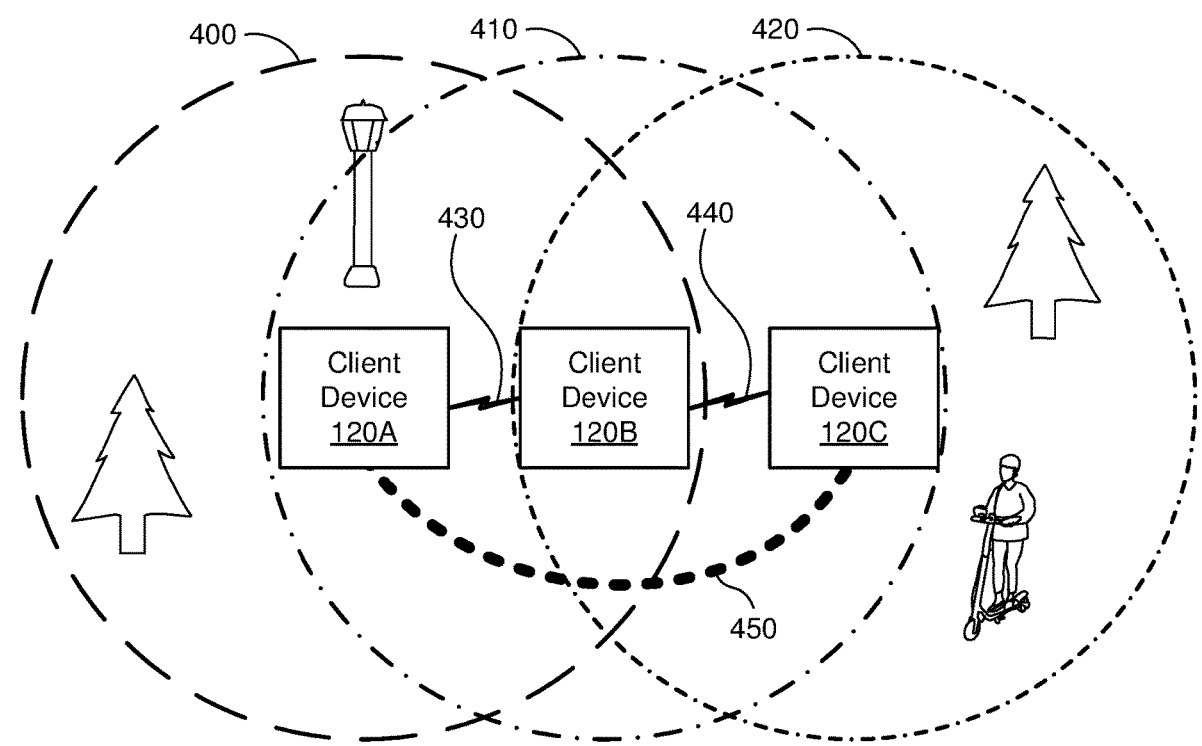
FIG. 4 is a conceptual illustration of an approach to extending the range of device-proximity detection, according to one embodiment.

An enhanced range may be a distance that is a multiple of a broadcasting network range. For example, two devices may be within a Bluetooth® range (e.g., sixty meters) of each other and a third device may be sixty meters away from one but one hundred and twenty meters away from another (e.g., in a configuration similar to that as shown in FIG. 4). Further following this example, devices may be within one hundred and eighty meters of each other while being within an enhanced range of one another: a fourth device is within sixty meters of the third device but one hundred and eighty meters away from the first device, but the Bluetooth advertisement of the fourth device is passed along from the third device to the second device, which in turn passes it along to the first device for the first device to determine that the fourth device is within its enhanced proximity. A maximum distance of the enhanced range may be preconfigured or dynamically adjusted based on a threshold number of players detected to be within an enhanced range of one another. For example, the enhanced proximity range may be increased until at least a threshold number of devices are within the enhanced proximity range or a maximum enhanced range is reached. Thus, players in more sparsely populated areas may have a greater enhanced range than those in densely populated areas.

In some embodiments, a client device 120A may receive proximity information of another device, determine that the other device is outside of the enhanced range, and determine that the other device is not proximate. For example, client devices may annotate proximity information passed along from device to device with a number indicating how many times the data has hopped from device to device (e.g., a device increments the number it receives before passing it along to another device). A client device may use a maximum hop number to determine a device is located further than an enhanced range away (e.g., a maximum enhanced range of thirty meters may be equivalent to a maximum hop number of three).

The device proximity module 210 may communicate with proximal devices to determine whether a device is within an enhanced range, which is also referred to as an enhanced proximity. Following the previous example, the device proximity module 210 can receive data from the client device 120B indicating that the client device 120C is within its network broadcasting range (e.g., after a device proximity module of the client device 120B determines which devices are within the proximity of the client device 120B). The device proximity module 210 may determine, after receiving the data from the client device 120B, whether the client device 120C is already within the network broadcasting range of the client device 120A. If the client device 120C is not already within the network broadcasting range, the device proximity module 210 may add a record of the client device 120C as being within an enhanced range of the client device 120A.

The device proximity module 210 may broadcast information about the client device 120A or devices within the proximity of the client device 120A to other devices. The device proximity module 210 may broadcast a list of devices within the proximity of the client device 120A. In some embodiments, the list may include devices within an enhanced proximity or a non-enhanced proximity (e.g., within a Bluetooth® broadcast range). A client device may automatically determine whether to broadcast a list of devices within an enhanced or non-enhanced proximity depending on the number of players within a non-enhanced proximity. For example, in a crowded area where the number of players within a Bluetooth® broadcasting range is larger than a threshold number, the client device may determine to limit the list of devices to within a non-enhanced proximity (e.g., to prioritize multiplayer activities with players in the immediate vicinity). In a sparsely populated area (e.g., a rural area) where the number of players within a Bluetooth® broadcasting range is lower than a threshold number, the client device may determine to share lists of devices within an enhanced proximity.

The device proximity module 210 may determine a likelihood that another client device is within a proximity of the client device 120A. The device proximity module 210 can use information provided within broadcast messages transmitted from nearby devices (e.g., Bluetooth® LE advertisements) to determine the likelihood. Information may include a timestamp at which the advertisement is generated, a hardware identifier of the device generating the advertisement, device type, device manufacturer, device movement data (e.g., accelerometer data), device capabilities, or any other suitable information about the device or broadcasting metadata. The device proximity module 210 can use information provided within messages generated by the location-based game application that include information relevant to the game. For example, the device proximity module of a nearby client device can generate a message that includes a player's identifier and the player's intention to participate or not participate in a multiplayer activity with proximate players. The generated message can then be transmitted over a local or personal area network to nearby devices.

The device proximity module 210 may receive data indicating that another client device has detected one or more other client devices within proximity or enhanced proximity. In some embodiments, the device proximity module 210 may receive a first timestamp of a first broadcast message generated by a first client device and receive a second timestamp of a second broadcast message generated by a second client device. The timestamps may indicate when the respective broadcast messages were generated or transmitted. The broadcast messages may be local or personal area network broadcast messages. The device proximity module 210 can compare the first and second timestamps. In response to determining that the first timestamp is within a threshold time range of the second timestamp, the device proximity module 210 may determine that the second client device is within the proximity or enhanced proximity of the first client device.

The device proximity module 210 may use the broadcast message data and a model (e.g., rules-based model, machine learning model, statistical model, or any suitable predictive algorithm) to determine a likelihood that devices are proximate to each other. In one example, the device proximity module 210 applies a machine learning model trained on broadcast message data for two or more devices labeled with whether the two or more devices were proximate to one another. The device proximity module 210 may represent the broadcast message data as feature vectors, where dimensions of the feature vectors correspond to independent data provided in the broadcast messages (e.g., timestamps, device type, and accelerometer data). The machine learning model may thus be trained to determine that two devices broadcasting messages that have substantially similar timestamps but one device is moving at ten kilometers per hour while one is stationary may have less than a ten percent likelihood of being proximate to one another.

In some embodiments, the game server 110 facilitates device proximity detection using information that the client devices transmit to the game server 110. For example, the client device 120A may transmit to the game server 110 the broadcast messages received from proximate devices. The game server 110 may then use the contents of the messages to determine the likelihood that the devices are within proximity of each other. In one example, the game server 110 receives broadcast messages from multiple client devices and uses timestamps of the broadcast messages and player identifiers provided in the broadcast messages to determine that the devices were in proximity to one another and transmit instructions to the respective client devices to initiate an action (e.g., an in-game item trade). To determine that the devices were indeed in proximity to one another, the game server 110 may determine that the timestamps list substantially similar times (e.g., within one minute of one another). However, in response to determining that the timestamps do not list substantially similar times (e.g., beyond one minute of one another), the game server 110 may determine that the devices were not proximate to one another.

In a first example of determining devices are not proximate to one another based on timestamps, a client device or a game server receives local or personal area network broadcast messages from two or more client devices. A device proximity module hosted on the client device may perform this determination. The client device or game server compares timestamps of the broadcast messages (e.g., to compare when the broadcast messages were generated or transmitted). In response to determining that the timestamps are within a threshold time range or duration (e.g., that the time difference between the earliest and latest time stamp is less than one minute), the client device or game server determines that the devices associated with the compared timestamps were within proximity of one another. The client device or game server may then notify the client devices associated with the compared timestamps of the determination that the devices were within proximity of one another (e.g., a message listing device identifiers or player identifiers and a binary flag indicating that the devices were within proximity or enhanced proximity of one another).

In a second example of determining devices are not proximate to one another based on timestamps, a player's client device receives a Bluetooth® advertisement of another device that had been at the player's present location ten minutes ago, but has since left, but the advertisement was still being communicated by remaining, local devices maintaining a list of devices that, at some time, were determined to be proximate. In this example, the player's client device, or a game server that has been forwarded the broadcast information from the player's client device, may determine that the timestamp indicating the advertisement was broadcasted ten minutes ago is beyond a threshold time duration of one minute since broadcast and that the other device is no longer within proximity.

The game module 220 operates a client-side game application for a parallel reality game hosted by the game server 110. In embodiments, the game module 220 communicates information about the virtual world with the user interface module 230, such as to display content associated with the virtual world. The game module 220 further receives or obtains game data from the game server 110. For example, the game module 220 may receive game data from the game server 110 describing available game content based on the location of a client device 120 (e.g., game items), the geographic locations of devices associated with other players, or upcoming community events (e.g., competitive tournaments). In the same or different embodiments, the game module 220 transmits information describing device proximity detections made by the device proximity module 210, or stored in the device detection data store 240, to the game server 110. In this case, the game module 220 receives or obtains game data from the game server 110 describing one or more game actions based on information describing device proximity detections provided by the game module 220 to the game server 110. Game actions based on device detections are described in greater detail below with reference to FIG. 3.

In some embodiments, the game module 220 transmits information describing device detections to the game sever 210 based on the occurrence of certain events. For example, if the game module 220 is disconnected from the game server 110 (e.g., when a client device 120 is not connected to the internet), the device proximity module 210 may store information describing any device detections which occurred during a time period when the game module 220 was disconnected. In this case, after the game module 220 reconnects to the game server 110 (e.g., over the network 130), the game module 220 may transmit some or all of the device detections which occurred during the time period. As another example, the game module 220 may transmit information describing one or more device proximity detections in response to certain user interactions with the client device 120, such as a user launching or resuming a client game application associated with a location-based game hosted by the game server 110. As still another example, the player associated with the client device 120 may manually indicate a desire to provide stored device detections through a user interaction with the client device 120. In the same or different embodiments, the game module 220 provides information describing one or more stored device detections to the game server 110 periodically, such as at a pre-defined time interval (e.g., every minute).

The client-side game application operated by the game module 220 can include a multiplayer activity (e.g., an AR activity). The game module 220 may receive from the game server 110 game data that includes data for providing the multiplayer activity at the client device 120A. For example, the game data of a multiplayer activity can include AR objects, game actions based on a number of players involved or players' proximities, reward objects for completing the multiplayer activities, special effects for rendering an environment of the multiplayer activity, etc. The game module 220 can receive the data for providing the multiplayer activity while the client device 120A is connected to the game server 110 and when the client device 120A cannot maintain a network connection with the game server 110, the game module 220 can still provide the multiplayer activity to the client device 120A (e.g., in an offline mode of the location-based game). The game module 220 may provide the multiplayer activity to the client device 120A in response to receiving user input indicating that the user is requesting to participate in the multiplayer activity.

In an offline mode of the location-based game (e.g., the client device 120A is not connected to the game server 110 through the network 130), the game module 220 may use a local network or PAN to communicate data between the game modules of other client devices to facilitate offline gameplay. For example, the game module 220 may use Bluetooth® to transmit a player's data (e.g., avatar appearance, gameplay statistics, gameplay inventory, etc.) to a game module of another client device, where the other game module may display the player's data via a user interface module of the other client device. The game module 220 can upload game data generated at the client device 120A during offline gameplay to the game server 110 when the client device 120A is online again (e.g., connected to the game server 110 through the network 130).

The game data communicated by the game module 220 can include player status information indicating their availability to participate in a multiplayer activity. This status information can indicate that player does not want to participate in a multiplayer activity, wants to participate, is currently participating and can accept additional players, is participating and cannot accept additional players, or any suitable status to enable another game module to facilitate a multiplayer activity between two or more players. After the device proximity module 210 determines that another client device is or has been within proximity of the client device 120A, the game module 220 can request status information of the other client device and begin facilitating a multiplayer activity depending on the received status information.

In one example of coordinating a multiplayer activity, the client device 120A is offline from the game server 110 and presently within Bluetooth range of the client device 120B, as determined by the device proximity module 210. The game module 220 transmits a request to the client device 120B for status information. The game module 220 uses received status information to determine that the client device 120B is not presently participating in a multiplayer activity but the corresponding player may like to participate. In response, the game module 220 transmits a multiplayer activity invitation to the client device 120B, where the invitation serves as a request for the availability of the multiplayer activity involving the players of the client devices 120A and 120B. If the player using the client device 120B accepts the invitation, the game module 220 determines that the multiplayer activity is indeed available and provides the multiplayer activity to at least the player of the client device 120A (e.g., the game module 220 may also transmit the game data of the multiplayer activity to the client device 120B).

In another example of coordinating a multiplayer activity, the client device 120A is presently online but was offline when the device proximity module 210 detected it was within proximity of the client device 120B. Furthermore, the player was not engaged with the location-based game at the earlier time (e.g., the client device 120A was in their backpack or the player was watching a movie downloaded to their device rather than playing the location-based game). At the earlier time, the game module 220 requests status information from the client device 120B, and the status information indicates that the client device 120B is presently participating in a multiplayer activity (e.g., with the client device 120C) and is accepting additional players. Since the player of the client device 120A is not engaged with the location-based game at the earlier time, the player does not participate with the multiplayer activity in real time. However, the game module 220 can record an identifier of the multiplayer activity or other suitable metadata of the multiplayer activity (e.g., a timestamp, a location, identifiers of the players involved in the multiplayer activity, etc.) for future access to game data of the multiplayer activity when the client device 120A returns online and can download the game data from the game server 110.

Alternatively or additionally, the game module 220 can download the game data of the multiplayer activity from the client device 120B while within proximity with the client device 120B. At the present time, the game module 220 provides a notification to the player that the multiplayer activity is available now. For example, the game module 220 may treat the real players as non-player characters and recreate gameplay as if the player of the client device 120A was participating in the live gameplay. When the devices were within proximity with one another, the devices may exchange game data relevant to the multiplayer activity (e.g., player identifiers, information, such as damage statistics, of game items usable by other players, or any other suitable information for facilitating multiplayer activity). The client devices may query the game server 110 for additional data about the other players associated with the proximate devices (e.g., query when their connection to the network 130 has returned). For example, the client device 120A may use the player identifier associated with the player of the client device 120B to query the game server 110 for a history of the actions that the player of the client device 120B has performed during multiplayer activities. The game data received when the devices were within proximity to one another, the additional game data queried from the game server 110, or a combination of both may be used by the game module 220 to recreate or simulate gameplay of the other players regardless of the current proximity of the client device 120A to other client devices. For example, the game module 220 may use geofencing associated with a point of interest (e.g., a landmark or other geographical location) to determine one or more players with which to recreate or simulate gameplay. In response to the player selecting the notification to indicate that they are interested in participating in the multiplayer activity, the game module 220 provides the multiplayer activity to the player (e.g., at the display of the client device 120A).

The user interface module 230 of the client device 120 constructs and displays components of user interfaces of the client device 120. In some embodiments, the user interface displays depictions of the virtual world to the user including components of the virtual world, such as virtual elements and virtual experiences, as received from the game module 220. The user interface module 230 may also display chat room locations in the virtual world, as well as messages sent between users in the chat rooms. A user may interact with the client device 120 to engage with virtual elements, participate in virtual experiences, or converse in chat rooms. For example, the user interface module 230 may display a view of the virtual world depicting points of interest, chat rooms, and other virtual experiences. The user of the client device 120 can interact with these components via the user interface to complete a task, join a chat room, or participate in a competition, among other actions.

In some embodiments, the user interface module 230 provides user interfaces relevant to proximity detections of one or more other client device 120. For example, the user interface module 230 may display a notification indicating that another client device 120 was detected and information relevant to the detection, such as a player ID of a player associated with the detected device or a time when the detection occurred. In the same or different embodiments, the user interface module 230 provides elements allowing a user of the client device 120 to determine what happens based on a proximity detection of other client devices. For example, the user interface module 230 may provide user interfaces including elements for adjusting proximity detection preferences (e.g., enable or disable device proximity detection), initiating a transmittal of information describing device proximity detections stored in the device detection data store 240, reviewing device proximity detections stored in the device detection data store 240, or selecting from possible game actions based on proximity detections. In particular, the user interface module 230 may provide an interface including elements for initiating proximity detection, such as a "search for other players" element (e.g., a button).

The user interface module 230 may provide user inputs for participating in a multiplayer activity with client devices proximate to the client device 120A. The user interface module 230 may provide a notification of an available multiplayer activity, where the notification may include game data describing the activity or players arranged to be involved in the activity. The notification can be a push notification provided at the client device 120A when the client device 120A is not executing the location-based application. For example, a notification may appear in the notifications bar of the user's smartphone. As another example, the user interface module 230 causes a push notification popup to appear over other applications executing on the client device 120A. The user may select the push notification and cause the client device 120A to launch the location-based application and participate in the multiplayer activity. The notification may be an invitation to join the multiplayer activity. The notification may be displayed by the user interface module 230 responsive to the device proximity module 210 detecting another device within range of the client device 120A and responsive to the game module 220 determining that status information received from the other device indicates that the other player wants to participate in the multiplayer activity. The user interface module 230 may receive user input selecting the displayed notification (e.g., a "Join Now" button of the displayed notification). In response to receiving the user input, the game module 220 may provide the multiplayer activity.

The device detection data store 240 is one or more computer-readable media configured to store information describing device proximity detections by the client device 120. The information stored by the device detection data store 240 may be received from the client device 120 or otherwise obtained or determined by the game server 110. In embodiments, the device detection data store 240 stores at least an identifier of a player associated with a device detected based on a device proximity detection. The device detection data store 240 may further store contextual information describing a device proximity detection, such as a timestamp indicating when a device proximity detection occurred or a geographic location (e.g., GPS coordinates) indicating where a device proximity detection occurred. In some embodiments where the game server 110 hosts multiple games, the device detection data store 240 stores information describing one or more games corresponding to a given device proximity detection (e.g., a game name or identifier). In still further embodiments, the device detection data store 240 stores security information preventing inaccurate or fraudulent proximity detections, a duration of time a proximity detection occurred (e.g., an amount of time another device was detected for), or other information describing players or devices relevant to a proximity detection.

The local data store 250 is one or more computer-readable media configured to store data used by the client device 120. For example, the local data store 250 may store the player location information tracked by the positioning device 210, a local copy of the current state of the parallel reality game, or any other appropriate data. The local data store 250 may also store player settings or preferences such as their preference to join a multiplayer activity, which can be used by a game module to determine whether a multiplayer activity should be facilitated between two proximate devices. Although the local data store 250 is shown as a single entity, the data may be split across multiple media. Furthermore, data may be stored elsewhere (e.g., in a distributed database) and accessed remotely via the network 130.

Figure 3:
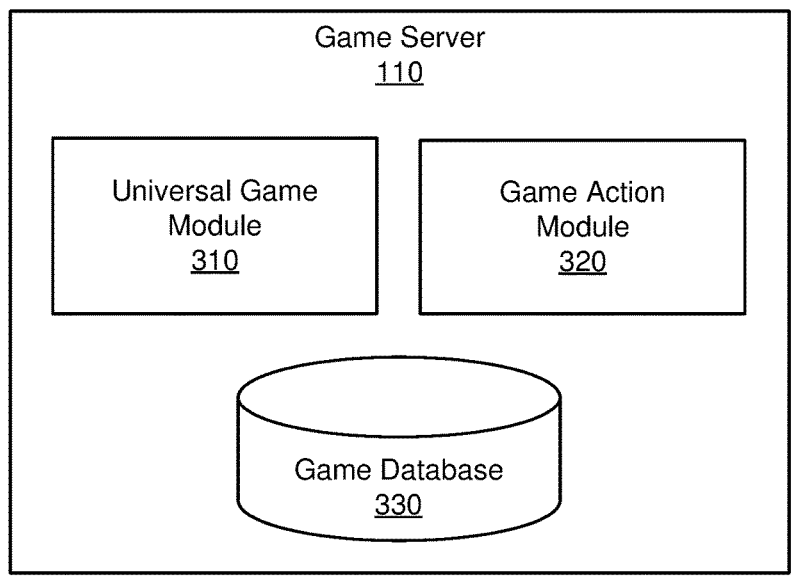
FIG. 3 is a block diagram of the game server shown in FIG. 1, according to one embodiment.

FIG. 3 illustrates one embodiment of the game server 110 hosting a location-based parallel reality game. In the embodiment shown, the game server 110 includes a universal game module 310, a game action module 320, and a game database 330. In other embodiments, the game server 110 contains different or additional elements. In addition, the functions may be distributed among the elements in a different manner than described.

The game server 110 can be configured to receive requests for game data from one or more client devices 120 (for instance, via remote procedure calls (RPCs)) and to respond to those requests via the network 130. For instance, the game server 110 can encode game data in one or more data files and provide the data files to a client device 120. In addition, the game server 110 can be configured to receive game data (e.g., player location, player actions, player input, etc.) from one or more client devices 120 via the network 130. For instance, the client device 120 can be configured to periodically send player input, player location, and other updates to the game server 110, which the game server 110 uses to update game data in the game database 330 to reflect changed conditions for the game. The game server 110 may also send game data to client devices 120, such as other player locations, chat room locations, or virtual element locations.

The universal game module 310 hosts the location-based game for players and acts as the authoritative source for the current status of the location-based game. The universal game module 310 receives game data from client devices 120 (e.g., player input, player location, player actions, player status, landmark information, etc.) and incorporates the game data received into the overall location-based game for all players of the location-based game. With the game data, the universal game module 310 stores a total game state of the game that can be sent to a client device 120 to update the local games state in the game module 220. The universal game module 310 can also manage the delivery of game data to the client devices 120 over the network 130.

The game action module 320 can be a part of or separate from the universal game module 310. The game action module may also be referred to generally as an application action module (e.g., for applications for fitness or social networking that are not necessarily facilitating gaming and exchanging game data). The game action module 320 is configured to perform game actions based on proximity detections performed by client devices 120. The game action module 320 receives information describing proximity detections from client devices 120. Using the received proximity detection information, the game action module 320 performs game actions which create, modify, or otherwise process game data. The game action module 220 can provide game data to client devices 120 based on performed game actions, such as a client device 120 which provided the proximity detection information to the game action module 320 resulting in the game actions. For instance, the game action module 320 performs game actions which process game data corresponding to players of the location-based game (e.g., associated with a profile or account for the player), such as any combination of game data described below with reference to the game database 330 (e.g., game data of types (1)-(9)). As an example, if a client device 120 associated with player A detects another client device 120 associated with a player B, the game action module 320 may modify the player profiles of player A or player B based on a game action.

In some embodiments, the game action module 320 communicates with the universal game module 310 in order to perform game actions. For example, the game action module 320 may communicate with the universal game module 310 to determine what game actions can be performed based on the received proximity detection information or other contextual information (e.g., the current time or game features). In the same or different embodiments, the game action module 320 provides information describing one or more game actions performed to a client device 120, such as information describing the processing performed on game data corresponding to one or more game actions. The information describing the one more game actions performed may include a notification for display on the client device 120, such as a notification indicating the game action occurred or describing the game action.

In various embodiments, the game action module 320 performs a game action which processes game data of one or both players corresponding to a device proximity detection. In some embodiments, the game action module 320 performs a game action for a player associated with a client device 120 which provided the information describing a proximity detection (i.e., the detecting device). For instance, if client device 120A provided information describing a device proximity detection of client device 120B, the game action module 320 could perform a game action affecting game data for a player associated with client device 120A. Such game actions may include the game action module 320 providing a game item as a reward to the player, providing game experience to the player (e.g., leveling up a game character associated with the player), recommending the player send a friend request to the other player, or other game actions specific to the player. As another example of a game action performed by the game action module 320 in response to proximity detection provided by a client device 120, the game action module 320 may provide a notification of a multiplayer activity to client devices detected to be within proximity of each other. If both users select the notifications and indicate that they want to participate in the multiplayer activity, the game action module 320 may provide the multiplayer activity to the proximate client devices.

In the same or different embodiments, the game action module 320 performs a game action which processes game data of a player associated with the detected device (e.g., client device 120B in the previous example). The game action module 320 may perform game actions for the player associated with the detected device which are the same as or different than those performed for the player associated with the detecting device. In still further same or different embodiments, the game action module 320 performs a game action which processes game data of both the player associated with the detecting device and the player associated with the detected device (e.g., both client device 120A and client device 120B in the above example). Game actions performed by the game action module 320 affecting the game data of both players may include exchanging game elements between the players (e.g., game items, images, messages, game statuses, etc.), providing game elements from one player to the other player, initiating an in-game event for both of the players (e.g., a battle), adding one player to an existing augmented reality experience in which the other player is already engaged, updating an in-game map associated with one or both of the players, or providing information describing the opposite player for establishing a connection between the players.

In some embodiments, the game action module 320 determines one or more game actions to perform based on whether the game action module 320 received information describing a device proximity detection from both client devices 120 involved in the proximity detection. For example, if the game action module receives information describing a detection of client device 120B from client device 120A, the game action module 320 may determine one or more game actions to perform based on whether information describing a detection of client device 120A from client device 120B is also received. In other embodiments, the game action module 320 determines one or more game actions to perform based on device proximity detection information received from a single client device 120.

In some embodiments, a game action performed by the game action module 320 is an exchange of game items between two players of the location-based game (i.e., a game item trade). For instance, in response to receiving information describing a proximity detection between a first player and a second player, the game action module 320 can obtain one or more game items associated with the first player to trade for one or more game items associated with the second player. In one embodiment, players are able to designate one or more game items (e.g., game items associated with their player profile or account) which they desire to trade with other players. As an example, a player may select from a set of game items they have collected by playing the location-based game to be added to a group of game items which can be traded with other players when a device proximity detection occurs. This selection may be made by the player using a client device 120 associated with the player or another device (e.g., a laptop or desktop computer) which can communicate with the game server 110. The game action module 320 can then execute a trade between two players when one or both of their associated client devices 120 detects the other device in the real world, as indicated by received device proximity detection information. For example, if client device 120A detects client device 120B, the game action module 320 can exchange one or more game items for a player associated with client device 120A and a player associated game client device 120B. In exchanging the game items, the game action module 320 updates game data in the game database 330. The game action module 320 may additionally, or alternatively, communicate with the universal game module 310 to execute the game item trade or convey that the game item trade occurred. In an embodiment, the game action module 320 provides a notification for display to one or both of the client devices 120 involved in a game item trade indicating the trade occurred or describing the details of the trade.

In various embodiments, the game action module 320 performs additional processing in order to execute a game item trade. In one embodiment, the game action module 320 determines or identifies values associated with game items designated for trade by players corresponding to a device proximity detection. A value for a game item may correspond to characteristics of a game item, a price for game items in a real or in-game currency, other indicators of a game item value, or some combination thereof. The game action module 320 uses the values of the game items in order to select one or more game items for each player corresponding to a device proximity detection to trade. For example, the game action module 320 may exchange game items which have the same value or values with a difference within a trade threshold. Other examples of information which the game action module 320 may consider in executing trades between players include associations between players in the location-based game (e.g., are the players' friends, are they both associated with an in-game organization, such as a team, etc.), or characteristics of the game items (e.g., a game item type).

The game database 330 includes one or more machine-readable media configured to store game data used in the location-based game to be served or provided to client devices 120 over the network 130. In embodiments, the game data stored in the game database 330 can include: (1) data associated with the virtual world in the location-based game (e.g. imagery data used to render the virtual world on a display device, geographic coordinates of locations in the virtual world, etc.); (2) data associated with players of the location-based game, such as player profile or account data (e.g. player information, player experience level, player currency, player inventory, current player locations in the virtual world/real world, player energy level, player preferences, team information, etc.); (3) data associated with game objectives (e.g. data associated with current game objectives, status of game objectives, past game objectives, future game objectives, desired game objectives, etc.); (4) data associated with virtual elements in the virtual world (e.g. positions of virtual elements, types of virtual elements, game objectives associated with virtual elements, corresponding actual world position information for virtual elements, behavior of virtual elements, relevance of virtual elements, etc.); (5) data associated with real world objects, landmarks, positions linked to virtual world elements (e.g. location of real world objects/landmarks, description of real world objects/landmarks, relevance of virtual elements linked to real world objects, etc.); (6) game status (e.g. current number of players, current status of game objectives, player leaderboard, etc.); (7) data associated with player actions/input (e.g. current player locations, past player locations, player moves, player input, player queries, player communications, etc.); (8) data associated with virtual experiences (e.g., locations of virtual experiences, players actions related to virtual experiences, virtual events such as raids, etc.); and (9) any other data used, related to, or obtained during implementation of the location-based game. The game data stored in the game database 330 can be populated either offline or in real time by system administrators or by data received from players, such as from one or more client devices 120 over the network 130.

The game database 330 may also store real-world data. The real-world data may include population density data describing the aggregate locations of individuals in the real world; player density data describing the aggregate locations of players in the real world; player actions associated with locations of cultural value or commercial value; player heat map data describing the distribution of game actions in a geographic area; point of interest data describing real-world locations that correspond to locations of virtual elements in the virtual world; terrain data describing the locations of various terrains and ecological conditions, such as large bodies of water, mountains, canyons, and more; map data providing the locations of roads, highways, and waterways; current and past locations of individual players; hazard data; weather data; event calendar data; activity data for players (e.g., distance travelled, minutes exercised, etc.); and other suitable data. The real-world data can be collected or obtained from any suitable source. For example, the game database 330 can be coupled to, include, or be part of a map database storing map information, such as one or more map databases accessed by a mapping service. As another example, the game server 110 can be coupled to one or more external data sources or services that periodically provide population data, hazard data, weather data, event calendar data, or the like.

Other modules beyond the modules shown in FIG. 3 can be used with the game server 110. Any number of modules can be programmed or otherwise configured to carry out the server-side functionality described herein. In addition, the various components on the server-side can be rearranged. Other configurations will be apparent in light of this disclosure and the present disclosure is not intended to be limited to any particular configuration.

FIG. 4 is a conceptual illustration of an approach to extending the range of device-proximity detection, according to one embodiment. The conceptual illustration includes an environment in which the client devices 120A and 120C are proximate to one another through an enhanced range. The client devices 120A-C have respective network broadcasting ranges 400, 410, and 420. The broadcasting ranges 400, 410, and 420 may be Bluetooth® LE broadcasting ranges of approximately sixty meters. Thus, each circle of the broadcasting range may have a radius of sixty meters. The client device 120A and the client device 120B may be separated from one another by less than sixty meters, and the device proximity modules of the respective devices may use a short-range, local connection 430 to determine that the two devices are within proximity of one another. Similarly, the client device 120B and the client device 120C are within ten meters of one another and may use a connection 440 to determine that the two devices are within proximity of one another. However, the client devices 120A and 120C are out of the broadcasting range from one another, and the device proximity modules of the respective devices may be unable to establish a short-range local connection and initially determine that the two devices are not within proximity of one another. However, a device proximity module of either the device 120A or 120C may determine that the client device 120B is proximate to the other device, and accordingly, determine that the other device is within an enhanced range and is indeed proximate. The client devices 120A and 120C may form a connection 450, which can be facilitated by the client device 120B. The device proximity module may request information of the proximate devices from the client device 120B. For example, the client device 120A receives, from the client device 120B, a player identifier of the player using the client device 120C.

Device Proximity Detection Methods

Figure 5:
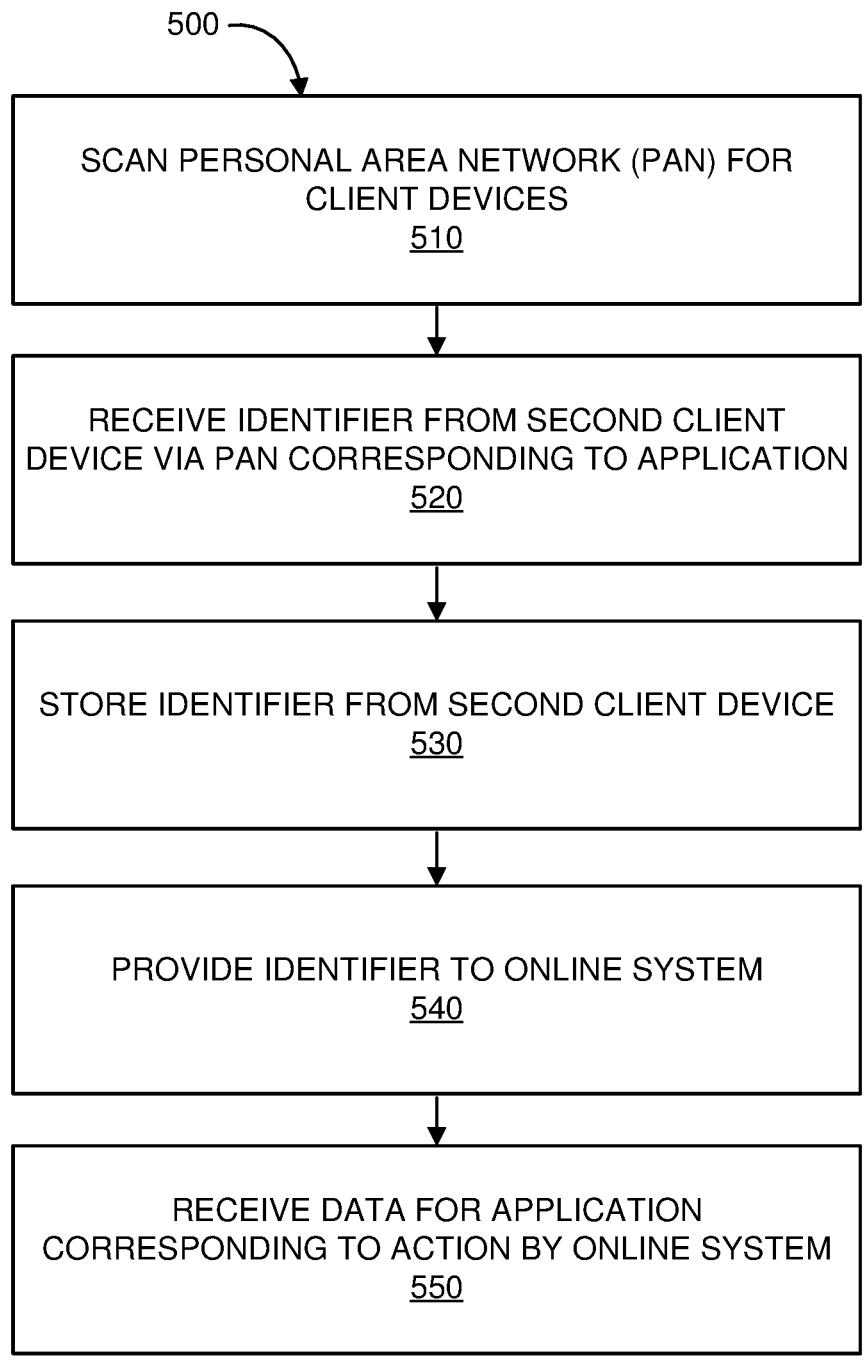
FIG. 5 is a flowchart illustrating a method for device proximity detection, according to one embodiment.

FIG. 5 is a flowchart illustrating an embodiment of a method 500 for device proximity detection. In the embodiment shown, the steps of FIG. 5 are illustrated from the perspective of a client device 120 performing the method 500. However, some or all of the steps may be performed by other entities or components. In addition, some embodiments may perform different steps or perform some of the steps in a different order or in parallel.

In the embodiment shown in FIG. 5, the method 500 begins with a first client device (e.g., the client device 120A) scanning 510 a PAN for other client devices. For example, the first client device may use a scanner of a PAN device to scan for information broadcast by PAN devices of other client devices 120 in order to make device proximity detections. Based on the scanning, the first client device receives 520 an identifier from a second client device (e.g., the client device 120B) via the PAN which corresponds to an application on the second client device. For example, the first client device may perform a proximity detection of the second client device by receiving information broadcast by the second client device (e.g., using the device proximity module 210) including a player ID of a location-based game player associated with the second client device. The first client device stores 530 the identifier received from the second client device. For example, the first client device may store the identifier in the device detection data store 240.

The first client device provides 540 the identifier to an online system corresponding to the application. For example, the first client device may provide the identifier to the game server 110 (e.g., using the game module 220). The first client device receives 550 data for the application corresponding to an action performed by the online system based on the receiving of the identifier by the first client device. For example, the first client device may receive game data corresponding to a game action performed by the game server 110.

Figure 6:
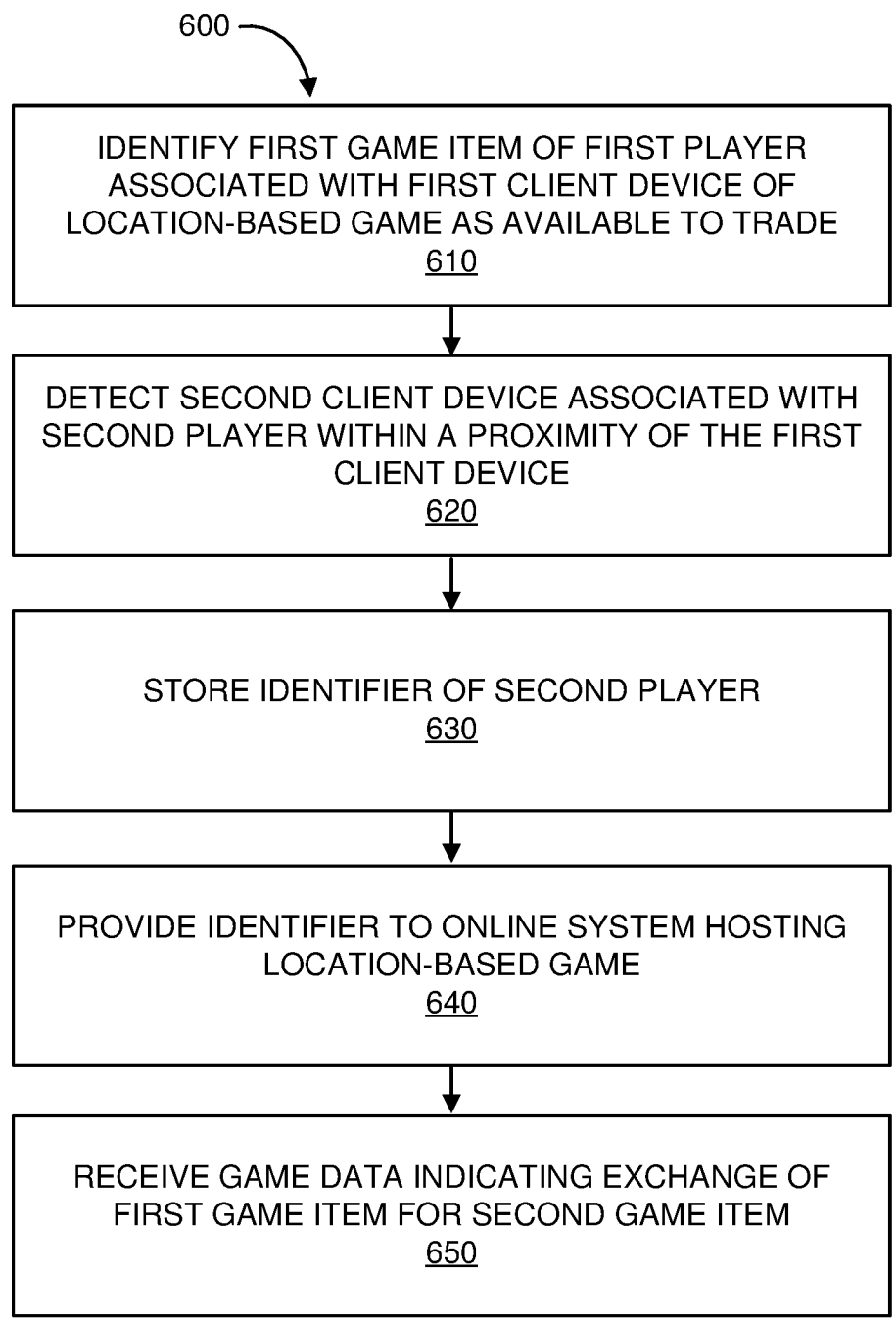
FIG. 6 is a flowchart illustrating a method for trading game items using device proximity detection, according to one embodiment.

FIG. 6 is a flowchart illustrating an embodiment of a method 600 for trading game items using device proximity detection. In the embodiment shown, the steps of FIG. 6 are illustrated from the perspective of a client device 120 performing the method 600. However, some or all of the steps may be performed by other entities or components. In addition, some embodiments may perform different steps or perform some of the steps in a different order or in parallel.

In the embodiment shown in FIG. 6, the method 600 begins with identifying 610 a first game item for a first player of a location-based game associated with a first client device (e.g., the client device 120A) as being available to trade. For example, the first player may designate one or more game items included in game data for the first player as available to trade. The first client device detects 620 a second client device associated with a second player (e.g., the client device 120B) within a proximity of the first client device. In particular, the first client device receives an identifier of the second player based on a proximity detection of the second client device. For example, the first client may perform a proximity detection of the second client device using the device proximity module 210. The first client device stores 630 the identifier of the second player. For example, the first client device may store the player identifier in the device detection data store 240.

The first client device provides 640 the identifier to an online system hosting the location-based game. For example, the first client device may provide the identifier to the game server 110 (e.g., using the game module 220). In response, the first client device receives 650 game data from the online system indicating an exchange of the first game item for the second game item. For example, the first client device may receive a push notification from the game server 110 indicating the exchange occurred or describing the game item which the first player received.

Figure 7:
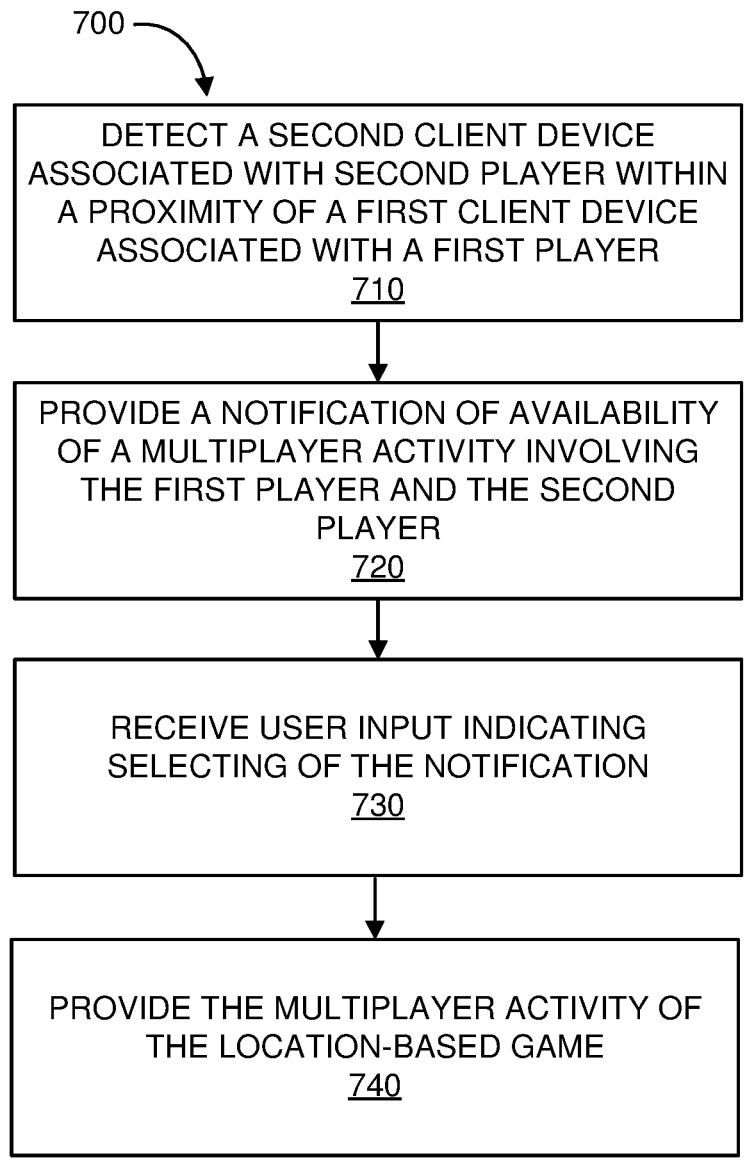
FIG. 7 is a flowchart illustrating an embodiment of a method for coordinating a multiplayer activity for devices detected to be within a proximity of each other.

FIG. 7 is a flowchart illustrating an embodiment of a method 700 for coordinating a multiplayer activity for devices detected to be within a proximity of each other. In the embodiment shown, the steps of FIG. 7 are illustrated from the perspective of a client device 120 performing the method 700. However, some or all of the steps may be performed by other entities or components. In addition, some embodiments may perform different steps or perform some of the steps in a different order or in parallel.

A first client device detects 710 a second client device within a proximity of the first client device. The first client device is associated with a first player and the second device is associated with a second player. For example, the first client device may be offline from a game server (e.g., the game server 110) and within Bluetooth® range of the second client device. A device proximity module of the first client device detects that the second client device is within the Bluetooth broadcasting range of the first client device, and thus, is within the proximity.

The first client device provides 720 a notification of availability of a multiplayer activity involving the first and second players. For example, a game module of the first client device provides a notification for display at a screen of the first client device that includes an invitation to participate in a multiplayer activity (e.g., an AR activity) with the second client device. Prior to providing the notification, the game module may determine whether the second player is available or wants to participate in the multiplayer activity. The game module can transmit a request to the second client device for status information. The game module can then use received status information to determine that the second client device is presently participating in a multiplayer activity (e.g., with a third client device) and is accepting additional players for the multiplayer activity. The game module can then provide 720 the notification for display at the first client device's screen (e.g., a string of text describing the invitation "Another trainer nearby is currently participating in a raid with other trainers. Would you like to join them?" and a user input button for accepting the invitation).

The first client device receives 730 user input indicating selecting of the notification. For example, a user interface module of the first client device displays the notification at the first client device with a user input element (e.g., a button) for the user to select the notification. The user input element may be for providing approval or rejection of an invitation to join a multiplayer activity.

The first client device 740 provides the multiplayer activity of the location-based game at the first client device. In one embodiment, in response to receiving the user's approval to join the multiplayer activity, the game module of the first client device sends a request to the second client device for an invitation to join the multiplayer activity. The game module of the second client device may generate and transmit the requested invitation to the game module of the first client device, where the invitation may include game data of the multiplayer activity that is stored locally at the second client device or at a game server (e.g., the second client device is online but the first client device is not). The game module of the first client device may use the received game data to provide the multiplayer activity at the first client device (e.g., via a user interface module).

Figure 8:
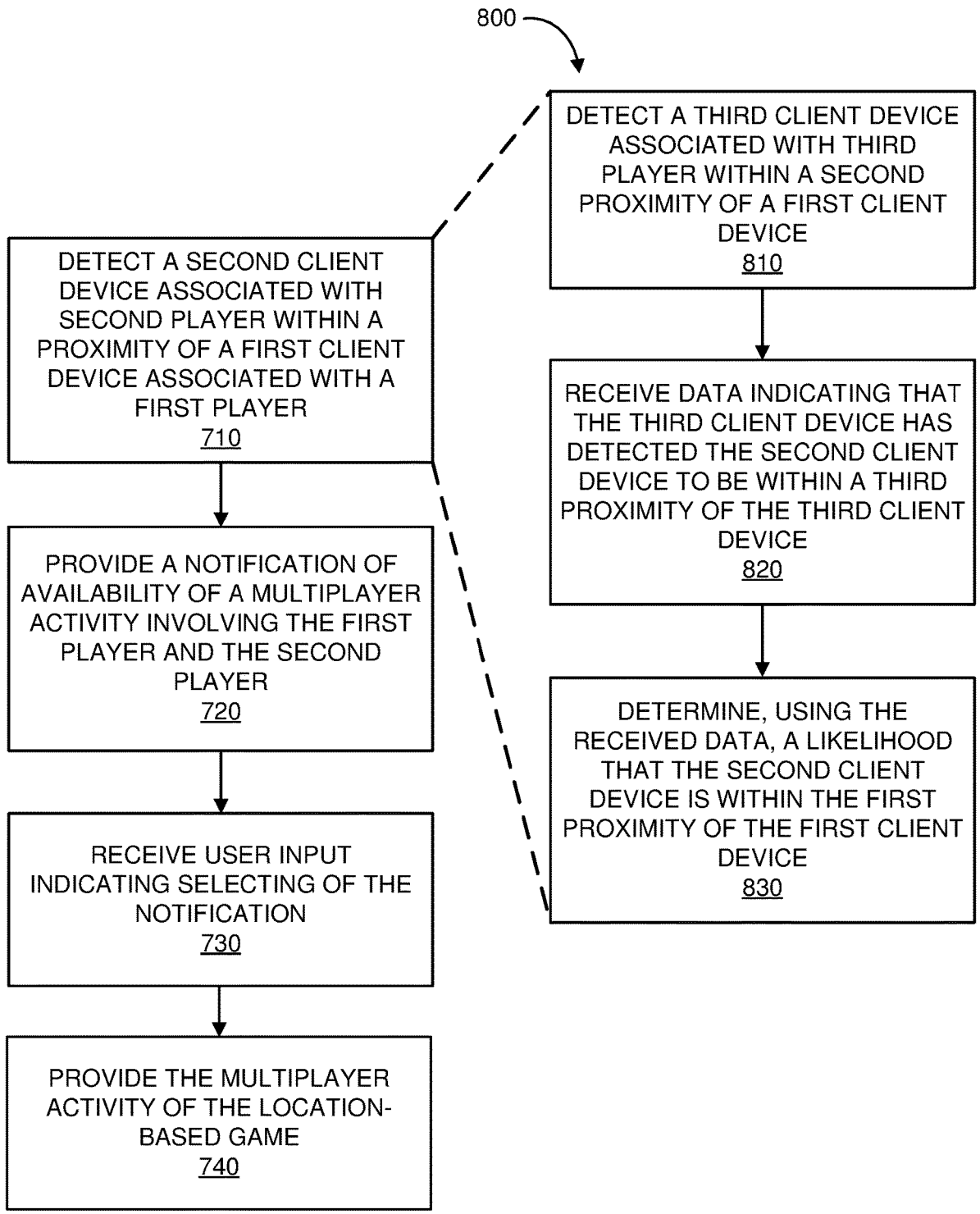
FIG. 8 is a flowchart illustrating an embodiment of a method for detecting a second client device within a proximity of a first client device.

FIG. 8 is a flowchart illustrating an embodiment of a method 800 for detecting a second client device within a proximity of a first client device. The method 800 is shown as one embodiment of the detecting 710 step in the method 700 of FIG. 7. The steps of FIG. 8 are illustrated from the perspective of a client device 120 performing the method 800. However, some or all of the steps may be performed by other entities or components. In addition, some embodiments may perform different steps or perform some of the steps in a different order or in parallel.

A first client device detects 810 a third client device within a second proximity of a first client device. The third client device is associated with a third player. A device proximity module of the first client device may detect 810 other client devices within proximity of the first client device. Referring to the layout of client devices shown in FIG. 4, the client device 120A, the first client device, can detect 710 the client device 120C, the second client device, using the method 800. The client device 120A detects 810 the client device 120B, the third client device. The detection

810 may be achieved through a local network or PAN connection such as Bluetooth® LE.

The first client device receives 820 data indicating that the third client device has detected the second client device to be within a third proximity of the third client device. The device proximity module of the first client device may receive 820 the data. The received 820 data may include broadcast information identifying the broadcasting device, the broadcast itself, or a combination thereof. Following the previous example that refers to the configuration in FIG. 4, the client device 120A can receive 820 data from the client device 120B, where the data includes or is derived from broadcast information transmitted by the client device 120C to the client device 120B. The client device 120C transmits data such as an identifier of the device, an identifier of the player, or a timestamp of the transmission within a broadcast message (e.g., a Bluetooth LE advertisement). The client device 120B receives the broadcast message from the client device 120C and can store the data or derive additional data from the received broadcast message. For example, the client device 120B may create a record of the broadcast message's contents and append data of the signal strength at which the broadcast message was received. The client device 120B can subsequently provide data received from other devices regarding their proximity, such as this example record, to other devices such as the client device 120A. The first client device may receive 820 the data in response to requesting the data from other client devices within proximity of its broadcasting range. Alternatively or additionally, the first client device may receive 820 the data automatically as part of the broadcast message received from other devices announcing their presence. Likewise, the first client device may broadcast data about devices within its proximity to other devices.

In another example of the first client device receiving 820 data indicating that the third client device has detected the second client device to be within a third proximity of the third client device, the third client device determines that both the first and second client devices are within proximity of the third client device using timestamps and subsequently, the third client device transmits data to the first client device indicative of this determination. For example, referring to the configuration in FIG. 4, the client device 120B receives local network broadcasting messages (e.g., Bluetooth® advertisements) from both the client device 120A and the client device 120C. The client device 120B then compares the timestamps of the received messages to determine whether the messages were generated or transmitted by the respective devices within a threshold time duration of one another (e.g., the time difference is one minute or less). In this example, the client device 120B may also have a device proximity module, a game module, and other components of FIG. 2 shown as hosted on the client device 120A. In particular, the device proximity module described here may be configured to perform this timestamp comparison to determine whether two or more devices are within proximity of each other.

The first client device determines 830, using the received data, a likelihood that the second client device is within the first proximity of the first client device. The device proximity module of the first client device may make this determination. The device proximity module may compare the determined 830 likelihood to a threshold to determine whether another device is within a proximity or enhanced proximity of the first client device. The first client device may implement a statistical model, decision tree, machine learning model, or any other suitable algorithm for determining a likelihood that two devices are within proximity of one another based on broadcasted data (e.g., timestamp of the broadcast, signal strength of received broadcast, broadcast sender, broadcast author, etc.). The first client device may also use additional context information such as a current location (e.g., GPS coordinates) as input into an algorithm for determining a likelihood that two devices are within proximity of one another. In one example where a third client device has compared timestamps associated with broadcast messages transmitted by the first device and a second device within the proximity of the third device, the first client device may determine 830, using a received confirmation that the timestamps met a condition indicating the devices are proximate (e.g., difference among timestamps is within a threshold time difference), that the likelihood that the second device is within proximity to the first device exceeds a threshold likelihood (e.g., 100% likelihood). Thus, the first client device determines 830 the devices are indeed within each other's proximity.

In one example of determining that two devices are likely within proximity of one another, using the configuration shown in FIG. 4, the client device 120A applies data received from the client device 120B to a statistical model to determine that the client device 120C is within proximity of the client device 120A with at least a threshold likelihood. The statistical model may be generated by the first client device or by a game server (e.g., the game server 110) and stored at the first client device. The first client device may use historical broadcast data received from client devices and verification of proximity to create the statistical model. Examples verifying proximity include confirmations from players confirming to the device proximity module 210 that another player is within an enhanced proximity or location information provided by the game server 110 while devices are online confirming that the other player is within the enhanced proximity. The client device 120A receives, from the client device 120B, a timestamp of the broadcast message from the client device 120C, a signal strength of the broadcast message from the client device 120C, and player identifier associated with the client device 120C and applies the received data to the statistical model. The output of the statistical model is a likelihood or score meeting a threshold (e.g., preconfigured threshold) indicating that the client device 120C is likely within an enhanced proximity of the client device 120A, as shown in FIG. 4.

Figure 9:
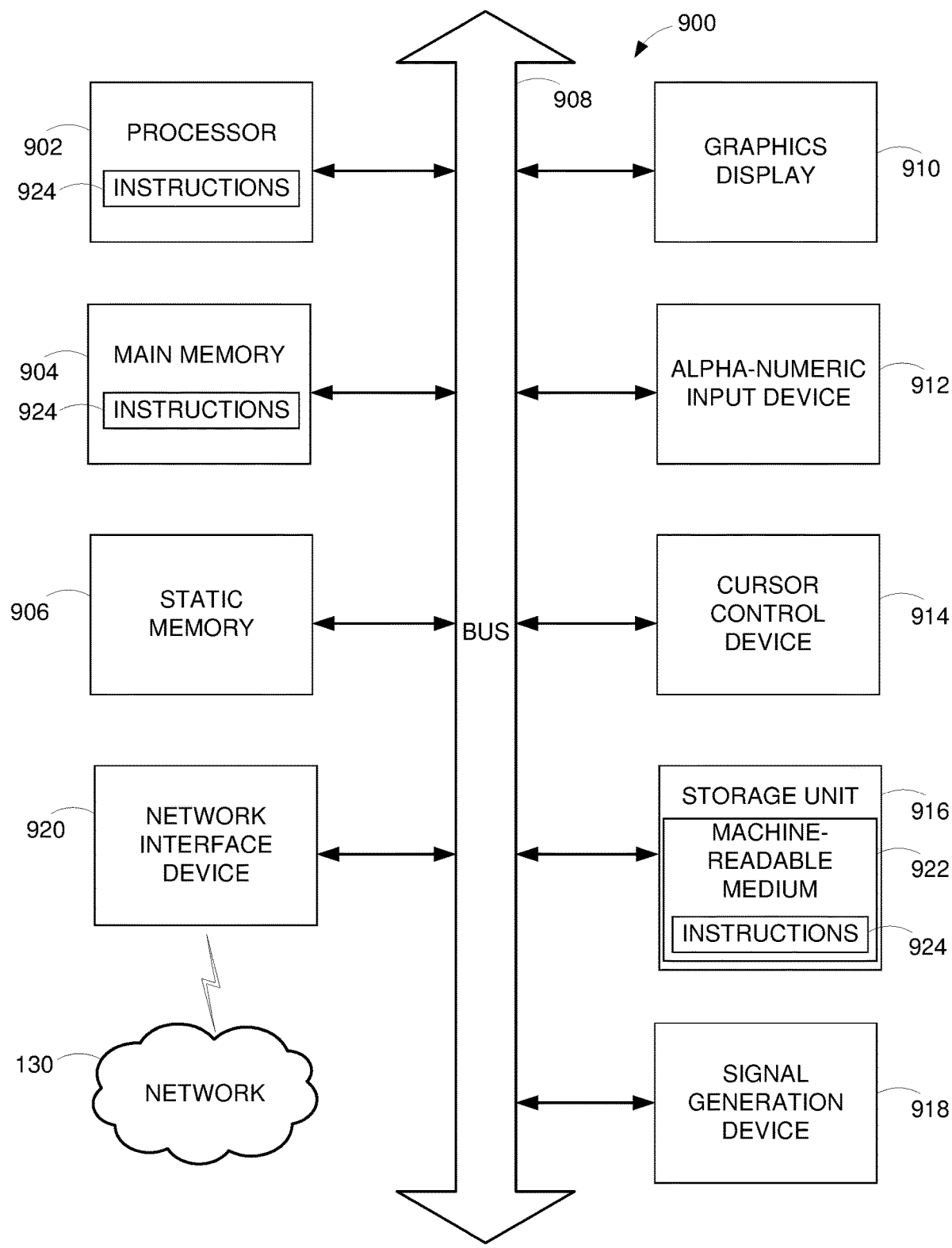
FIG. 9 is a block diagram illustrating an example computer suitable for use in the computing environment of FIG. 1, according to one embodiment.

FIG. 9 is a block diagram illustrating an example computer suitable for use in the network computing environment of FIG. 1, according to one embodiment. Specifically, FIG. 9 shows a diagrammatic representation of a machine in the example form of a computer system 900. The computer system 900 can be used to execute instructions 924 (e.g., program code or software) for causing the machine to perform any one or more of the methodologies (or processes) described herein, including those associated, and described, with the components (or modules) of a game server 110 or client device 120.

The machine may be a server computer, a client computer, a personal computer (PC), a tablet PC, a set-top box (STB), a smartphone, a network router, switch or bridge, a cell phone tower, or any machine capable of executing instructions 924 (sequential or otherwise) that specify actions to be taken by that machine. Further, while only a single machine is shown, the term "machine" shall also be taken to include any collection of machines that individually or jointly execute instructions 924 to perform any of the disclosed methods.

The example computer system 900 includes one or more processing units (generally one or more processors 902). The processor 902 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. Any reference to a processor 902 may refer to a single processor or multiple processors. The computer system 900 also includes a main memory 904. The computer system may include a storage unit 916. The processor 902, memory 904, and storage unit 916 communicate via a bus 908.

In addition, the computer system 900 can include a static memory 906, a display driver 910 (e.g., to drive a plasma display panel (PDP), a liquid crystal display (LCD), or a projector). The computer system 900 may also include alphanumeric input device 912 (e.g., a keyboard), a cursor control device 914 (e.g., a mouse, a trackball, a joystick, a motion sensor, or other pointing instrument), a signal generation device 918 (e.g., a speaker), and a network interface device 820, which also are configured to communicate via the bus 908.

The storage unit 916 includes a machine-readable medium 922 which may store instructions 924 (e.g., software) for performing any of the methods or functions described herein. The instructions 924 may also reside, completely or partially, within the main memory 904 or within the processor 902 (e.g., within a processor's cache memory) during execution by the computer system 900. The main memory 904 and the processor 902 also constitute machine-readable media. The instructions 924 may be transmitted or received over a network 130 via the network interface device 920.

While the machine-readable medium 922 is shown in an example embodiment to be a single medium, the term "machine-readable medium" should be taken to include a single medium or multiple media (e.g., a centralized or distributed database, or associated caches and servers) able to store the instructions 924. The term "machine-readable medium" shall also be taken to include any medium that is capable of storing instructions 924 for execution by the machine and that cause the machine to perform any one or more of the methods or functions disclosed herein. The term "machine-readable medium" includes, but is not limited to, data repositories in the form of solid-state memories, optical media, and magnetic media.

While the present subject matter has been described in detail with respect to specific exemplary embodiments and methods thereof it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations or additions to the present subject matter as would be readily apparent to one of ordinary skill in the art.

Additional Considerations

Some portions of above description describe the embodiments in terms of algorithmic processes or operations. These algorithmic descriptions and representations are commonly used by those skilled in the computing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment. Similarly, use of "a" or "an" preceding an element or component is done merely for convenience. This description should be understood to mean that one or more of the element or component is present unless it is obvious that it is meant otherwise.

Where values are described as "approximate" or "substantially" (or their derivatives), such values should be construed as accurate+/−10% unless another meaning is apparent from the context. From example, "approximately ten" should be understood to mean "in a range from nine to eleven."

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Upon reading this disclosure, those of skill in the art will appreciate still additional alternative structural and functional designs that may be used to employ the described techniques and approaches. Thus, while particular embodiments and applications have been illustrated and described, it is to be understood that the described subject matter is not limited to the precise construction and components disclosed. The scope of protection should be limited only by the following claims.

What is claimed is:

1. A non-transitory computer readable medium comprising instructions, the instructions, when executed by a first client device associated with a first user of a location-based application, causing the first client device to perform operations including:
    detecting, while the first device does not have connectivity to an online system hosting the location-based application, a second client device within a proximity of the first client device, the second client device associated with a second user of the location-based application;
    providing an identifier of the second user to the online system by:
        detecting that the first client device has connectivity to the online system via a network,
        receiving an identifier of the second user over a local network or a personal area network (PAN), and
        transmitting the identifier of the second client device to the online system via the network;
    providing, responsive to detecting the second client device, a notification of availability of a multi-user activity involving the first user and the second user;

receiving user input indicating selecting of the notification; and responsive to the user input, providing the multi-user activity of the location-based application.

2. The non-transitory computer readable medium of claim 1, wherein the proximity is a first proximity, and wherein detecting, by the first client device, the second client device comprises:

detecting a third client device within a second proximity of the first client device, the third client device associated with a third player of the location-based application; and receiving, from the third client device, data indicating that the second client device is within a third proximity of the third client device.

3. The non-transitory computer readable medium of claim 2, wherein the second proximity and the third proximity are within a personal area network broadcasting range of the third client device, and wherein the first proximity is greater than the personal area network broadcasting range.

4. The non-transitory computer readable medium of claim 1, wherein detecting the second client device comprises receiving an identifier of the second user over a local network.

5. The non-transitory computer readable medium of claim 1, wherein detecting the second client device comprises receiving an identifier of the second user over a PAN.

6. The non-transitory computer-readable storage medium of claim 5, wherein the personal area network is a Bluetooth® Low Energy network.

7. The non-transitory computer readable medium of claim 1, wherein the operations further comprise:

storing, responsive to detecting the second client device, by the first client device, the identifier of the second user.

8. The non-transitory computer readable medium of claim 7, wherein storing the identifier of the second user comprises:

comparing the identifier of the second user to one or more previously stored user identifiers, the one or more previously stored user identifiers associated with corresponding timestamps indicating when the one or more user identifiers were stored on the first client device; and responsive to determining the identifier of the second user was not previously stored on the client device within a time interval, storing the user identifier with a current timestamp.

9. The non-transitory computer readable medium of claim 1, wherein the location-based application is a parallel reality game.

10. The non-transitory computer readable medium of claim 1, wherein the second client device is detected while the first client device does have connectivity to an online system hosting the location-based application, and wherein the operations further comprise:

receiving, from the online system, status information indicating whether the second client device is participating in the multi-user activity during the time that the second client device was detected;

responsive to determining, using the status information, that the second client device is participating, requesting, by the first client device, an invitation to join the multi-user activity, the notification comprising the invitation; and responsive to determining, using the status information, that the second client device is not participating, requesting, by the first client device, the availability of the multi-user activity involving the first user and the second user.

11. The non-transitory computer readable medium of claim 10, wherein requesting the availability of the multi-user activity comprises determining that the second client device has indicated an intention to join the multi-user activity.

12. The non-transitory computer readable medium of claim 1, wherein the multi-user activity is an augmented reality (AR) activity.

13. The non-transitory computer readable medium of claim 1, wherein the second client device is detected while the first client device does not have connectivity to an online system hosting the location-based application, and wherein the operations further comprise:

receiving, from the second client device, status information indicating whether the second client device is participating in the multi-user activity during the time that the second client device was detected;

requesting, responsive to determining, using the status information, that the second client device is participating, an invitation from the second client device to join the multi-user activity, the notification comprising the invitation; and responsive to determining, using the status information, that the second client device is not participating, initiating, by the first client device, the multi-user activity including the first user and the second user in an offline environment, wherein game data generated from the multi-user activity in the offline environment is stored locally at one or more of the first client device or the second client device and uploaded to the online system when the one or more of the first client device or the second client device has connectivity to the online system.

14. The non-transitory computer readable medium of claim 1, wherein the notification is a push notification provided for display at a screen of the first client device.

15. A non-transitory computer readable medium comprising instructions, the instructions, when executed by a first client device associated with a first user of a location-based application, causing the first client device to perform operations including:

detecting, while the first client device does not have connectivity to an online system hosting the location-based application, a second client device within a proximity of the first client device, the second client device associated with a second user of the location-based application;

providing, responsive to detecting the second client device, a notification of availability of a multi-user activity involving the first user and the second user;

receiving, from the second client device, status information indicating whether the second client device is participating in the multi-user activity during the time that the second client device was detected;

responsive to determining, using the status information, that the second client device is participating, requesting an invitation from the second client device to join the multi-user activity, the notification comprising the invitation; and responsive to determining, using the status information, that the second client device is not participating, initiating, by the first client device, the multi-user activity including the first user and the second user in an offline environment, wherein game data generated from the multi-user activity in the offline environment is stored locally at one or more of the first client device or the second client device and uploaded to the online system when the one or more of the first client device or the second client device has connectivity to the online system.

16. The non-transitory computer readable medium of claim 15, wherein the proximity is a first proximity, and wherein detecting, by the first client device, the second client device comprises:
detecting a third client device within a second proximity of the first client device, the third client device associated with a third player of the location-based application; and
receiving, from the third client device, data indicating that the second client device is within a third proximity of the third client device.

17. The non-transitory computer readable medium of claim 16, wherein the second proximity and the third proximity are within a PAN broadcasting range of the third client device, and wherein the first proximity is greater than the PAN broadcasting range.

18. The non-transitory computer-readable storage medium of claim 16, wherein the operations further comprise:
transmitting a first broadcast message to the third client device, the first broadcast message including a first timestamp indicating when the first broadcast message was transmitted; and
wherein receiving data indicating that the third client device has detected the second client device to be within the third proximity of the third device comprises:
receiving a timestamp comparison result determined by the third client device, the timestamp comparison result indicating that the first timestamp is within a threshold time range of a second timestamp of a second broadcast message, the second timestamp indicating when the second broadcast message was transmitted by the second client device.

19. An online system comprising:
a database storing application data for a location-based application;
an application action module configured to perform operations comprising:
detecting, by a first client device associated with a first user while the first device does not have connectivity to an online system hosting the location-based application, a second client device within a proximity of the first client device, the second client device associated with a second user of the location-based application;
providing an identifier of the second user to the online system by:
detecting that the first client device has connectivity to the online system via a network,
receiving an identifier of the second user over a local network or a PAN, and
transmitting the identifier of the second client device to the online system via the network;
providing, responsive to detecting the second client device, a notification of availability of a multi-user activity involving the first user and the second user;
receiving, at the first client device, user input indicating selecting of the notification; and
responsive to the user input, providing the multi-user activity of the location-based application.

20. The online system of claim 19, wherein the proximity is a first proximity, and wherein detecting, by the first client device, the second client device comprises:
detecting a third client device within a second proximity of the first client device, the third client device associated with a third player of the location-based application; and
receiving, from the third client device, data indicating that the second client device is within a third proximity of the third client device.

* * * * *